July 15, 1941. J. R. HOGE 2,249,709

MACHINE FOR FORMING HOLLOW GLASS ARTICLES

Filed July 29, 1936 7 Sheets-Sheet 1

INVENTOR
J. R. Hoge
BY
Rule & Hoge
ATTORNEYS.

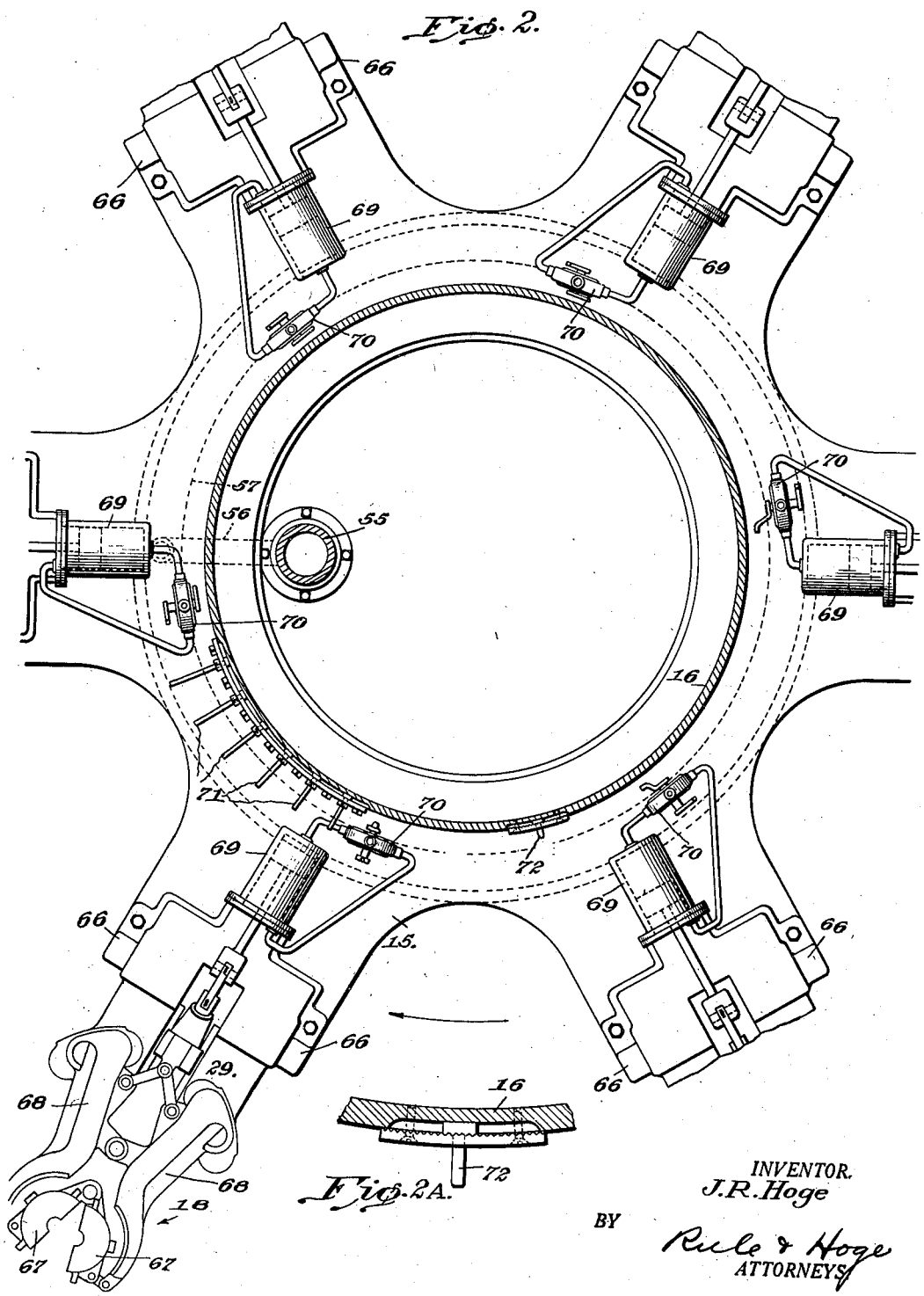

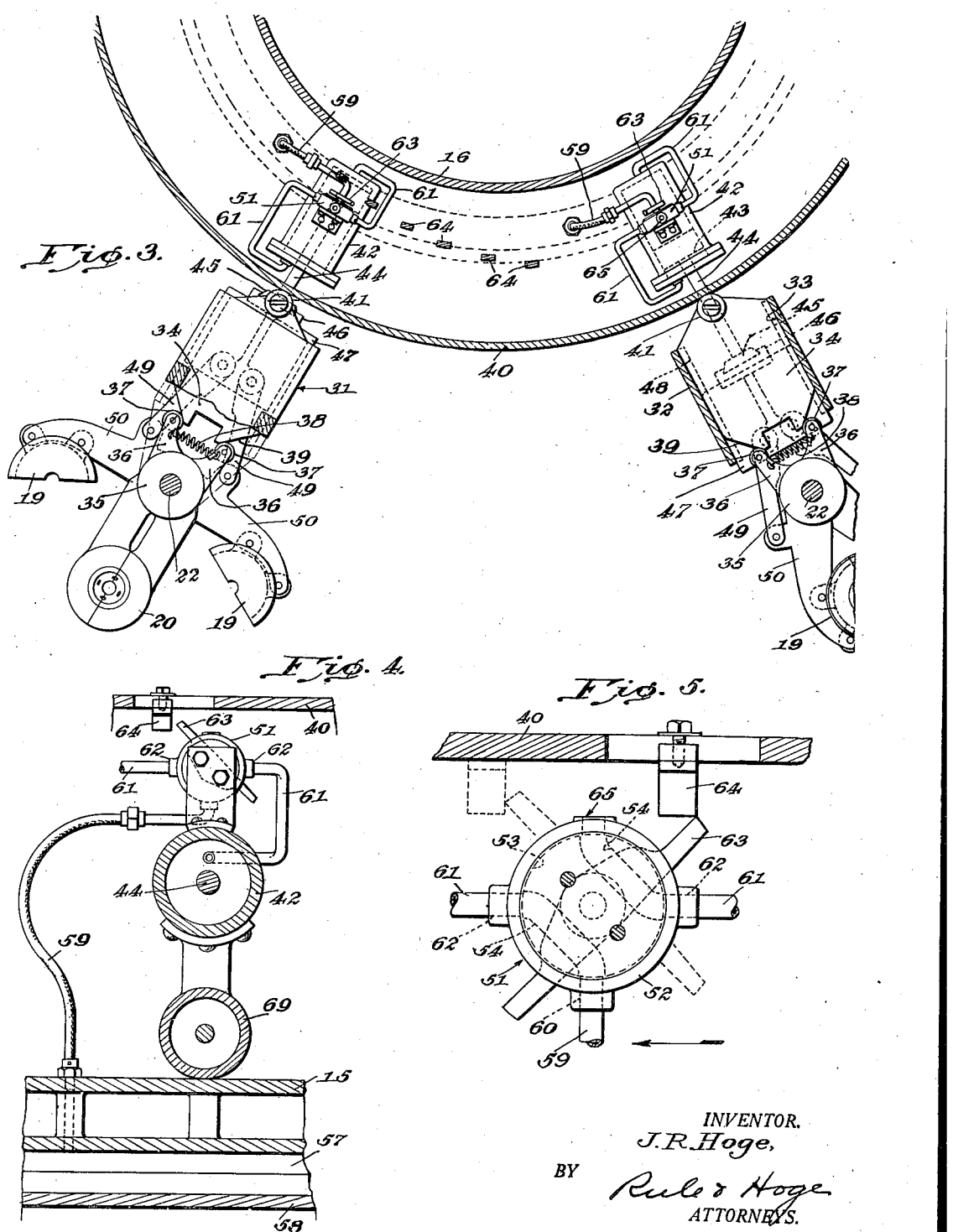

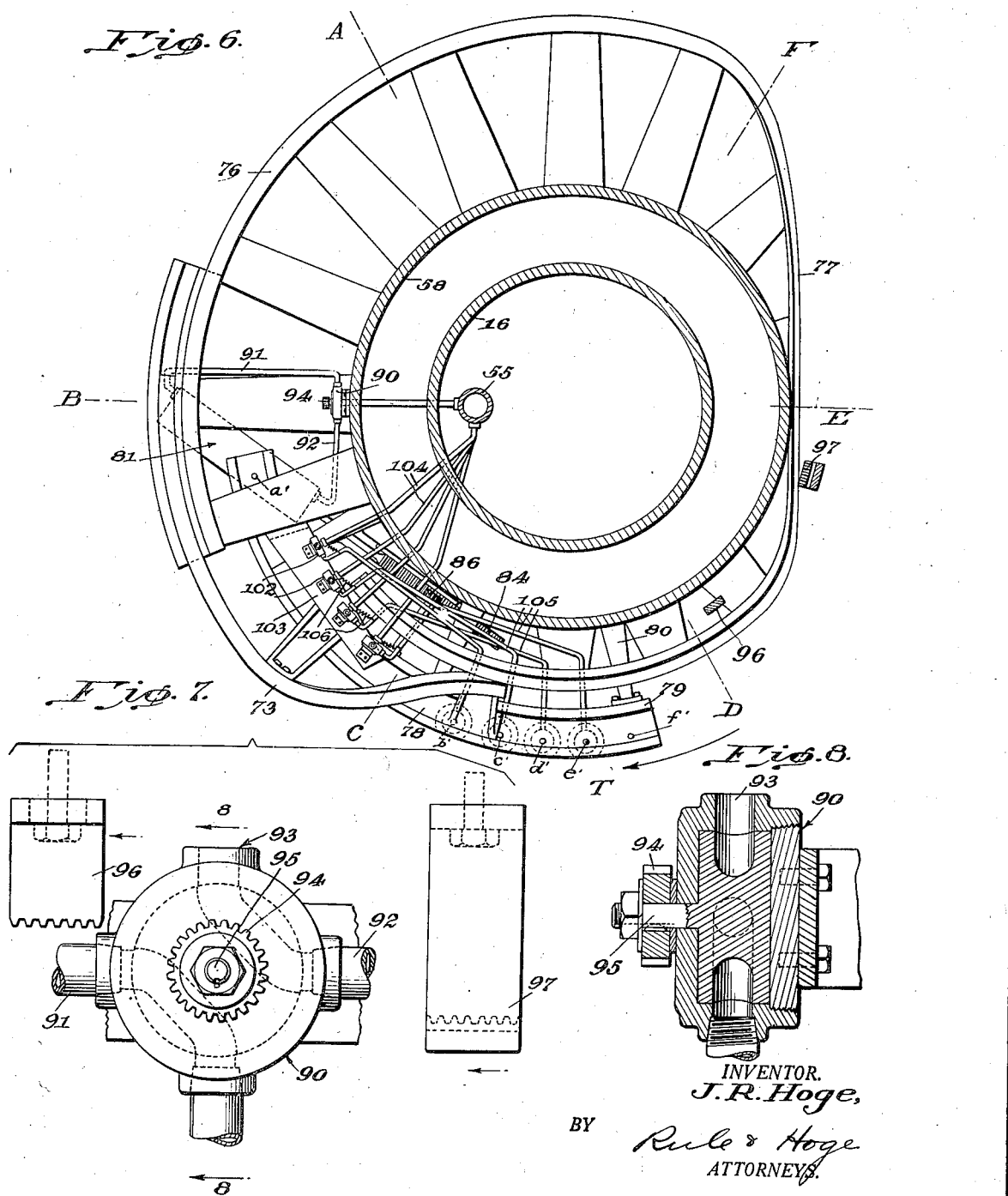

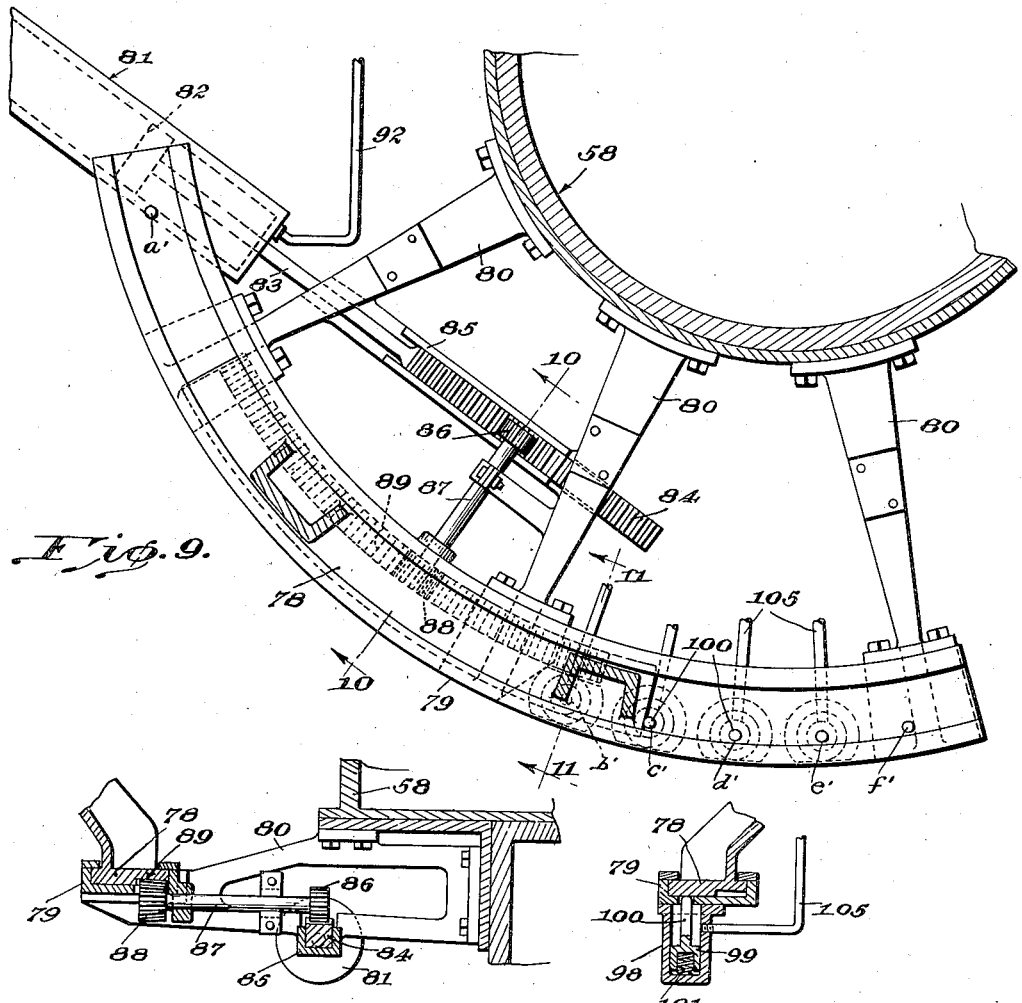

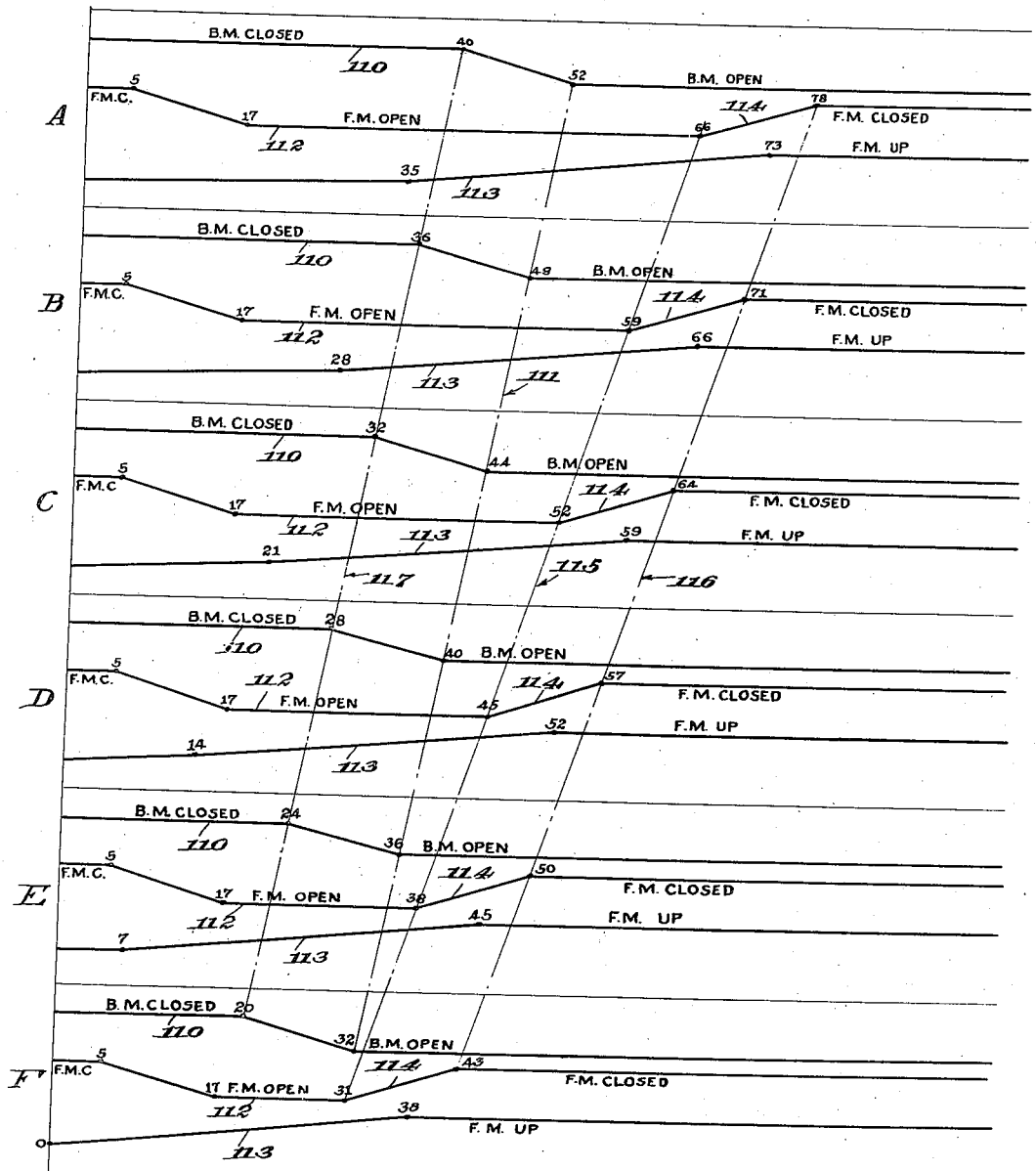

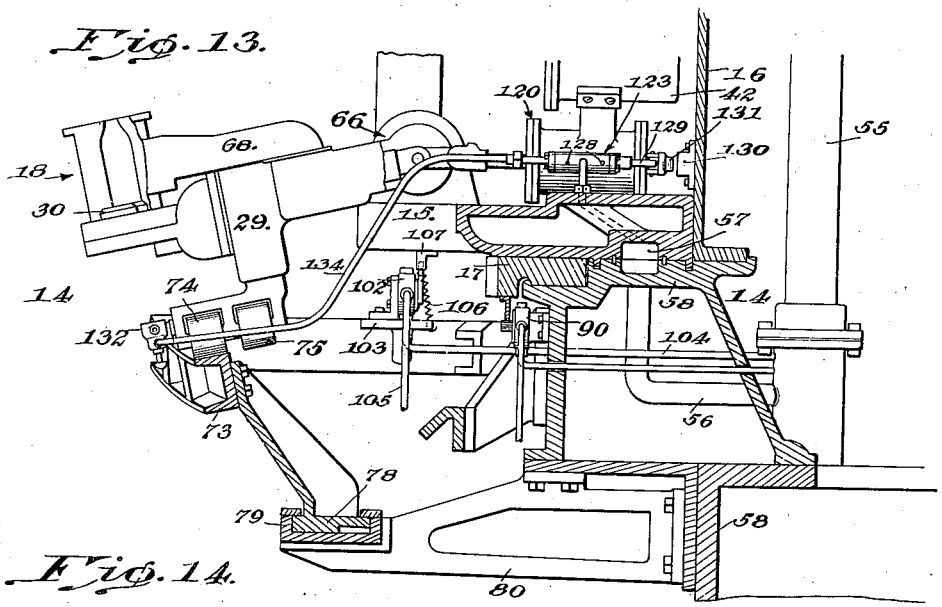
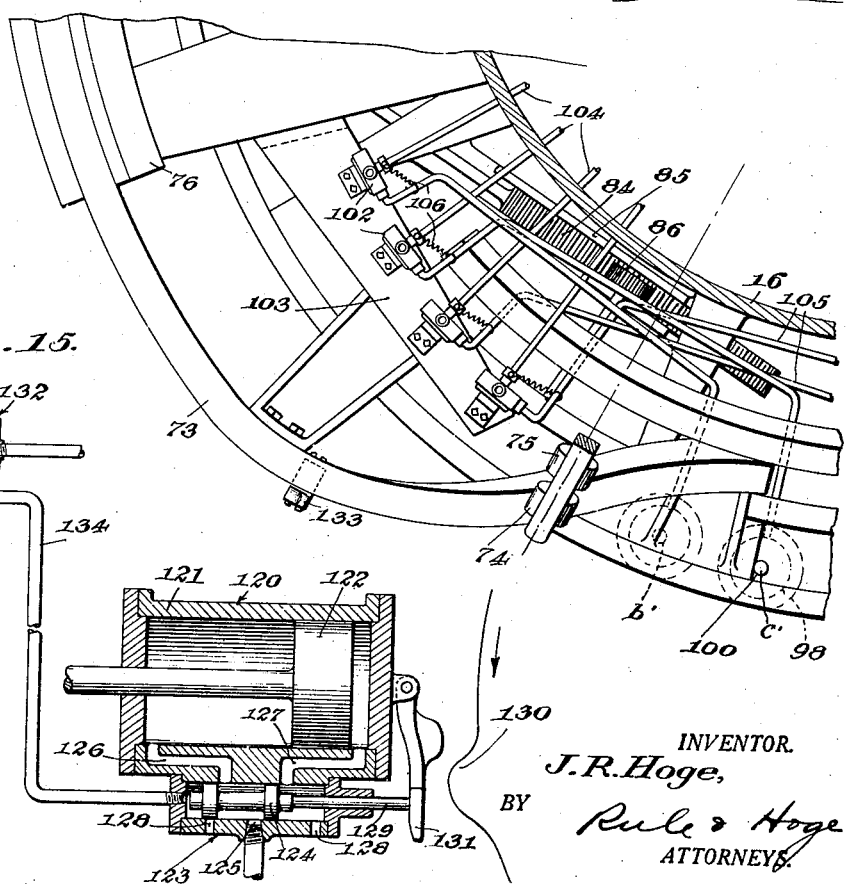

Patented July 15, 1941

2,249,709

UNITED STATES PATENT OFFICE 2,249,709

MACHINE FOR FORMING HOLLOW GLASS ARTICLES

John Ralph Hoge, Toledo, Ohio, assignor to Owens-Illinois Glass Company, a corporation of Ohio Application July 29, 1936, Serial No. 93,211

6 Claims. (Cl. 49—5)

The present invention relates to automatic machines for forming bottles, jars and other hollow glass articles. More particularly, the invention relates to machines of the single table continuously rotating type comprising mold groups, each including a parison mold which receives a charge of molten glass and molds it to form a parison, and a finishing mold to which the bare parison is transferred and in which it is expanded to its final form.

Commercial machines of this general character are usually designed for making ware in large variety as to size, shape and weight. This, if ware of good quality is to be obtained, necessitates various adjustments of the several operations involved in fabrication of an article. For example, in the manufacture of small ware and articles having comparatively thin walls, the charges of glass when introduced into the blank mold are comparatively hot and for best results, the forming operations require a relatively short time, owing to the rapid cooling of the glass. When the blank mold is opened the bare parison must be quickly enclosed in the finishing mold and blown to its final form before the rapid cooling and hardening of the glass prevents satisfactory blowing of the article. On the other hand, in the manufacture of comparatively heavy articles, the reduction in temperature of the glass is slower, requiring the parison to be retained in the parison mold for a longer time interval.

Commercial machines generally are so designed that the latest possible opening of the parison mold is permitted before the finishing mold closes, to thereby obtain, prior to the parison transferring operation, the requisite cooling of the parisons in making comparatively heavy ware. With such machines, when making small or light ware, the parison mold is necessarily opened comparatively early, to prevent excessive chilling of the glass in the mold. As a result, the bare parison is exposed for a correspondingly long period of time before being enclosed in the finishing mold, whereas a comparatively short time exposure of the parison to the outside air is the most desirable and, as a matter of fact, is essential to the attainment of satisfactory results. An object of my invention is to overcome this difficulty by providing means to adjustably and automatically control the parison transfer operations.

The present invention is herein illustrated as adapted to an Owens type of suction gathering machine, certain features of the invention relating particularly to and being of special value in such type machine. The machine comprises a horizontally rotating mold carriage on which are mounted mold groups each including a body blank mold and a neck mold which together form a parison mold or shaping unit, and a finishing mold. After a charge of glass is introduced by suction into the parison mold and the parison formed, the blank mold is opened, leaving the bare parison suspended from the neck mold. The finishing mold carrier then swings upwardly, bringing a mold bottom into supporting contact with the lower end of the bare parison, after which the finishing mold sections swing together to completely enclose the suspended parison. While the bare parison is supported in the neck mold a puff of air is usually applied to the initial blow opening which has been formed in the upper end thereof by a plunger. This enlarges the initial opening, mainly in a downward direction, and also causes an elongation or sagging of the parison. When the mold bottom is brought upward into engagement with the bottom end of the parison it spreads the lower end portion of the parison and tends to envelop and eliminate the usual shear mark resulting from severing the glass at the lower end of the blank mold. The upward swinging movement of the finishing mold is controlled by a stationary cam track on which the finishing mold runs so that the finishing mold is lifted at a predetermined point during each rotation of the mold carriage. As the lifting and closing of the finishing mold cannot take place until after the blank mold has opened, commercial machines, prior to the present invention, have been designed to allow a late opening of the body blank mold so that sufficient cooling of the parison may take place when comparatively heavy ware is being made. If the molds are changed for making comparatively small light weight ware, adjustment of the blank mold opening cam is made for effecting an early opening of the blank mold. As a result, the bare parison is exposed for an unduly long time interval before being enclosed in the finishing mold. During this exposure the bare parison is subjected to air currents which produce uneven chilling of the parison, and a resulting unevenness of wall thickness and other defects in the finished article. Also, the vibration of the machine and the centrifugal force tend to swing the bare parison out of its vertical position so that it does not contact centrally with the mold bottom when the latter is lifted. Owing to the late engagement of the mold bottom with the parison, undue sagging of the latter may take place, and also chilling to such an extent that the mold bottom is ineffective to remove the shear mark in the manner above indicated.

An object of the invention is to provide adjustable mechanism by which the time of lifting the finishing mold and closing it about the suspended parison may be adjusted to correspond to the time at which the blank mold is opened and to adjustably control the time interval between the opening of the blank mold and the closing of the finishing mold in keeping with the size, shape and condition of the parison.

Another object of the invention is the provision of mechanism individual to the mold groups of a machine of the above character whereby each of said mold groups is capable of producing ware of different size and weight independently of each other.

A further object of the invention is to provide mechanism on a machine of the above character, which is operable independently by each of the mold groups thereon to increase or decrease the time interval required to completely form a bottle of a predetermined size and weight.

A still further object of the invention is the provision of mechanism for regularly and automatically controlling the time interval between the opening of the blank mold, the raising of the finishing mold carriage, and the closing of the finishing mold prior to the final expansion of the parison therein.

Other objects and advantages will become apparent during the course of the following description.

In the accompanying drawings:

Fig. 2 is a sectional plan view of the finishing mold control mechanism, parts being shown in elevation and taken on line 2—2 of Fig. 1;

Fig. 2A is an enlarged fragmentary sectional view of the finishing mold opening trip;

Fig. 3 is a sectional plan view of the blank mold operating mechanism, taken on the line 3—3 of Fig. 1;

Fig. 4 is a vertical sectional view through the mold operating cylinders taken on line 4—4 of Fig. 1;

Fig. 5 is an elevational view of the valve for controlling the blank mold operation;

Fig. 6 is a sectional plan view of the serpentine track and operating mechanism therefor, taken on line 6—6 of Fig. 1;

Fig. 7 is an elevational view of the valve for controlling the operation of the drive motor;

Fig. 8 is a vertical sectional view through the valve taken on line 8—8 of Fig. 7;

Fig. 9 is a fragmentary sectional plan view of the track operating mechanism taken on line 9—9 of Fig. 1;

Fig. 10 is a vertical sectional view through the track driving mechanism taken on line 10—10 of Fig. 9;

Fig. 11 is a vertical sectional view through one unit of the track stop mechanism taken on line 11—11 of Fig. 9; and Fig. 12 is a diagrammatic chart illustrating the cycle of operation of the several heads;

Fig. 13 is a fragmentary sectional elevational view of a finishing mold unit illustrating a modified mold closing mechanism;

Fig. 14 is a sectional plan view of a portion of the serpentine track embodying the said mechanism taken on line 14—14 of Fig. 13; and Fig. 15 is a diagrammatic view of the mold operating mechanism shown in the position preceding the closing of the mold.

Figure 1:
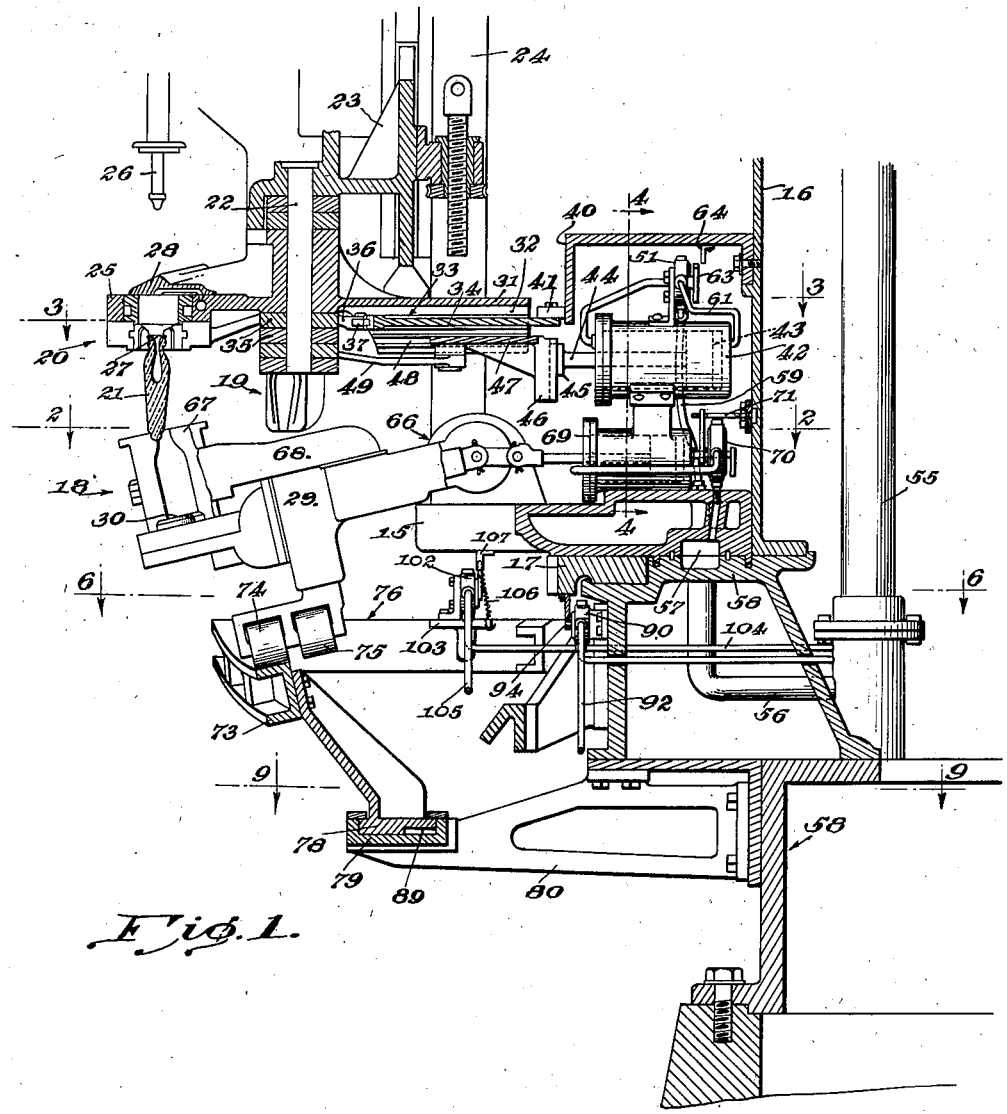
Fig. 1 is a fragmentary sectional elevation of one head or unit of a machine embodying my invention.

Referring particularly to Fig. 1 of the drawings which shows one head or unit of a suction type machine, to which the present invention is applied, the machine comprises a mold carriage 15 mounted for rotation about a central stationary column 16 and is adapted for continuous rotation about the vertical axis of the column. Rotation of the carriage 15 is accomplished by means of a motor (not shown) which has driving connection with a ring gear 17 secured to the carriage. The machine comprises as usual a series of ware forming units or heads which in the present embodiment are six in number, although in commercial machines of this type now in use the number of heads may vary from five to fifteen according to conditions and requirements. By employing a machine having six forming units, a sufficient range of operation is permitted to clearly illustrate the invention without needlessly encumbering the description thereof by the addition of further details.

Each forming unit comprises a finishing mold 18, a body blank mold 19 and a neck mold 20 in the form of separable mold halves and are spaced around the mold carriage 15 for rotation therewith. The molds 19 and 20 register with each other to form a parison 21 as the heads are brought in succession through a gathering area over a pool of molten glass (not shown). Mechanism not shown for lowering the heads successively into the glass for gathering a charge of glass into the molds is illustrated in detail in Patent No. 1,185,687 to LaFrance which further describes the method by which the parison is formed. The molds 19 and 20 (Fig. 1) are pivoted upon a vertical hinge pin 22 carried by a dip frame 23 which is mounted for vertical sliding movement in slideways 24 supported on the carriage 15. A head 25 forming a part of the dip frame 23 and positioned in alignment with the neck mold 20 is arranged to provide part of the vacuum and air conduits to the molds for forming and completing the parison. A plunger 26 (Fig. 1) shown above the head 25 and neck mold 20 is adapted to seat within the mold to form the initial blow opening 27 and partially shape the neck portions of containers as the molten glass is drawn into the molds. When the molds have been filled, the dip frame 23 is raised above the level of the glass a distance sufficient to permit a "cutoff" knife (not shown) to shear the trailing glass from the gathered mold charge. The knife is held in contact with the mold bottom for the purpose of sealing the charging opening while the plunger 26 is withdrawn, at which time a blow slide 28 carried on the head 25 is moved to cover the opening left by the removal of the plunger and establish communication between a source of supply of air under pressure and the initial blow opening in the mold charge. The plunger is allowed to remain within the neck mold for an interval sufficient to extract considerable heat from the glass and thereby permit hardening or setting of the glass and prevent sagging or distortion of the neck portion of the ware after the mold 19 has opened. When the body mold 19 is open a puff of air is admitted to the neck end of the parison whereby the blow opening 27 is enlarged and the parison slightly expanded in a downward direction. This causes a sagging of the soft tip at the lower end of the parison, the purpose of which will become apparent presently. The contact of the molds with the glass produces a chilled surface or skin on the parison which, if the parison were allowed to remain therein unduly long, would become so thick and heavy as to prevent proper finishing of the article. Likewise unnecessarily long exposure of the parison to the atmosphere during transferring results in similar difficulties.

The formed parison is transferred to the finishing mold 18 for final fabrication, said mold being supported on a carrier 29 pivoted for vertical swinging movement on the rotating carriage 15 and positioned in register with the neck mold 20 when in raised position. A mold bottom plate 30 is mounted on the carrier 29 in vertical alignment with the mold 18. On raising the carrier 29 the bottom plate 30 is brought into contact with the soft tip of the parison and spreads the tip in a manner to partially enclose and reheat the adjacent cooler portions of the lower end of the parison. The concentrated heat of the soft glass tends to soften these chilled portions chilled by the cutoff knife, during a period of reheating prior to the final expansion of the parison.

As has been previously brought out, the quality of the ware depends largely upon the interval of time required to fabricate an article of given size and weight. The ideal cycle of operation required for producing ware of different sizes varies according to the size and weight of the glass required. In order to produce ware of different sizes simultaneously on one machine, I provide mechanism for individually controlling operations of the several heads. The mechanism comprises individual means for automatically opening and closing the finishing mold 18 and body blank mold 19 and means operated by rotation of the mold carriage 15 for raising the finishing molds at predetermined regulable intervals with respect to each head.

The body blank mold unit (Figs. 1 and 3) comprises a slide support member 31 formed on the head 25 and extending radially inward therefrom. The member 31 is formed with depending side walls 32 having grooves 33 therein in which a neck mold opening slide 34 is mounted. The bearing rings 35 for supporting the neck mold 20 are provided with inwardly extending lugs 36 to which are attached rollers 37. The neck mold 20 is normally maintained in closed position by a coil spring 38 secured between the lugs 36 and is periodically opened by means of the slide 34 which is provided on its outer end with beveled surfaces 39 registering with the rollers 37. Movement is imparted to the slide 34 by a cam 40 mounted on the stationary column 16 and cam roll 41 carried on the inner end of the slide 34.

Mechanism for operating the blank mold 19 comprises an air operated motor 42 mounted for rotation with the carriage 15 and having a piston 43 and rod 44 mounted therein. The rod 44 is provided with a head 45 adapted for vertical sliding engagement with a grooved tail piece 46 formed on the inner end and depending from a slide member 47. The member 47 is mounted for sliding movement in grooves 48 formed in the side walls 32 and disposed beneath the neck mold slide 34. Links 49 pivoted to the forward end of the slide 47 are connected to the blank mold arms 50 for swinging the mold into and out of registration with the neck mold 20.

Figs. 1, and 3 to 5 inclusive, illustrate the valve for controlling the operation of the air motor 42, one of which is provided on each head. The valve 51 comprises a casing 52 mounted on and above the motor 42 and includes a rotor 53 having pairs of connected ports 54 adapted to alternately supply air under pressure to either end of the motor 42. Air under pressure from a source (not shown) is supplied to the machine through a pipe 55 (see also Fig. 6) located within the central column 16 from which a pipe 56 supplies operating air to an annular channel 57 formed between the rotating carriage 15 and the base 58 of the machine. The channel 57 provides a constant supply of air to each of the valves 51 by means of pipes 59 connecting with intake ports 60 in the valves. Pipes 61 connect oppositely disposed ports 62 in the valve with the motor 42 whereby air is admitted to either side of the piston 43 for opening or closing the blank mold.

The valve is actuated by means of a lever 63 or finger which is secured to the rotor 53 and is adapted to shift the valve to alternate positions when brought into contact with one of a series of adjustable mold opening trips 64 mounted on the under side of the stationary neck mold cam plate 40. Each valve is reversed to close the molds at a predetermined point by a trip (not shown) which engages the lower end of the finger 63 to place the opposite end of the motor 42 in communication with an exhaust port 65 located in the top of the valve. The spacing of the adjustable trips 64 is determined by the cycle of operation as it pertains to the individual heads. Each finishing mold carrier 29 (Figs. 1 and 2) is pivoted in journals 66 bolted to the carriage 15 whereby it is free to raise to receiving position at a predetermined point which is variable through a portion of the rotation. The mold 18 includes separable mold halves 67 adapted to be swung open and closed by mold arms 68 which are operated by a piston motor 69 mounted on the carriage 15. The motor 69 provides support for the blank mold motor 42 to which it is bolted. The motors 69 are separately controlled by valves 70 which are similar in construction to the blank mold operating valves 51 and are operated to close the molds by means of a series of trip pins 71 adjustably mounted on the column 16. A valve reversing trip 72 (Figs. 2 and 2A) is positioned to open the finishing molds in succession as they advance to the take-out station to discharge the finished ware. The point at which the finishing molds are closed about the formed parison is regulated according to the quantity of glass and the time required to properly form the parison in the blank mold.

The finishing mold carriers 29 are raised to the transferring position by means of an adjustable inclined track section 73 (Figs. 1 and 6). A roll 74 supports the carrier when passing over the track section 73 and a second roll 75 mounted adjacent the roll 74 on the carrier provides support for the molds while closed and in blowing position on a level raised track section 76. The finishing molds are permitted to swing downwardly under the forebay of the melting furnace on a track section 77 from which the molds are raised to the take-out station T. Prior to the molds entering the downwardly inclined track section 77 the neck mold 20 is automatically opened by means of the cam 40 to release the bottle neck.

In Fig. 6 the letters A to F inclusive designate the relative positions of the six forming head units wherein (for illustrative purposes) the head A is adapted to form a parison of approximately 12 oz. in weight. In each succeeding head unit the capacity of the molds is decreased progressively by 2 oz. stops in the direction opposite to the rotation of the machine, the mold on the head "F" having a capacity of approximately 2 oz. The adjustable track section 73 is movable through a total of approximately 35° to advance in a step-by-step fashion the point of raising the finishing mold. The inclined track 73 is mounted on an arcuate slide member 78 illustrated in Figs. 1, 6, and 9 to 11 inclusive, which is supported in a slideway 79 mounted on brackets 80 bolted to the machine base 58.

The track section 73 is indexed by means of a piston motor 81 supported on the stationary base 58. A piston 82 and piston rod 83 mounted within the motor is connected to a rack bar 84 slidably mounted in a guide 85 secured to the brackets 80. A pinion 86 meshing with the rack 84 transmits motion to the slide 78 through a shaft 87 and beveled pinion 88 in mesh with an arcuate rack 89 formed on the underside of the slide 78.

Air is supplied to the motor 81 from the supply pipe 55 and is controlled by a valve 90 shown in Figs. 7 and 8. The valve 90 is similar in construction to the valve 51 and is shown in position for supplying air through a pipe 91 to the rear or left-hand end of the motor 81 (Fig. 6). A pipe 92 connects the opposite end of the motor to the exhaust port 93. A pinion 94 mounted on the valve rotor shaft 95 is operated by racks 96 and 97 bolted to the driving gear 17. The rack 96 is mounted in a position to operate the valve 90 after the finishing mold of the head F reaches the top of the inclined track section 73 at which time the air entering the rear end of the cylinder as indicated in Fig. 7 causes the piston 82 to move the track in the direction of machine rotation at a speed equal to that of the machine and thereby maintain the finishing mold in raised position while advancing toward the level track section 76. When the piston 72 has reached the end of the stroke the slide 78 is held against a stop a' which position corresponds with the timing of the head A and provides the longest interval of parison exposure which is through approximately 38° of machine travel as indicated in Fig. 12.

The rack 97 is located in a position to reverse the valve 90 after the mold carriage of the head A has been raised to the level track. This causes the track to move in a counter-clockwise direction until the slide 78 engages a removable stop member at b'. In this position the track section 73 permits an earlier raising of the mold on head B which is of less capacity than the preceding mold. The track is advanced progressively to meet each oncoming head until the cycle is completed at stop f' which is stationary. This position of the inclined track section provides the earliest raising of the finishing mold and also permits the shortest interval possible between the blank mold opening and finishing mold closing movements, which is approximately 23°.

The adjustable stops b' to e' inclusive are illustrated in Fig. 11 and each comprises a cylinder 98 bolted to the underside of the slideway 79. A plunger 99 disposed vertically within the cylinder 98 is provided with an upwardly extending pin 100 which forms the stops b', c', etc. The pin 100 is normally projected through the slideway 79 and into the path of the track-supporting slide 78 by means of a coil spring 101 located within the lower end of the plunger. The stops are released by means of a series of valves 102 (Figs. 1 and 6) mounted on a bracket 103 which is bolted to a stationary track support. Air is supplied to the valves 102 through pipes 104 leading from the pipe 55, and pipes 105 connect the valves with the upper ends of the cylinders 98. The valves are normally held in closed position by a spring 106 and are of an open and closed type for periodically admitting puffs of air into the cylinders 98 to release the stops. Trip members 107 for opening the valves are mounted on the carriage 15 and are so disposed that each valve in turn is operated as each succeeding head reaches the raised portion of the track to advance the inclined section to meet the following head. It will be observed that pressure is constantly applied to the front end of the motor 81, thus advancing the track as the stops are released. When the machine has completed one revolution, the rack 96 operates the valve 90 to effect the return of the inclined section to begin a new cycle.

In Fig. 12 the chart illustrates the relation of various operations of the forming machine as regulated and controlled by the mechanism just described. The molds move from left to right in this figure. As has been noted, the larger parisons require a longer time interval for fabrication than parisons of less weight and it is therefore evident that the blank mold indicated by the line 110 will remain closed longer on the A head than on the F head shown at the bottom of the diagram. The dot and dash line 111 indicates the relative points at which the blank molds are fully open and the parison exposed to the atmosphere. The finishing molds are opened to discharge the finished ware at a point common to all of the heads as indicated by the line 112. In order that the parison will not remain exposed unduly long, the finishing molds are raised, as indicated at 113, at the earliest possible time which will avoid interference with the opening blank molds. There may well be an overlapping of the mold raising and closing movements 114 which is a further aid in decreasing the interval of exposure of the parison. The finishing molds start their closing movement at the points intersected by the dot and dash line 115 and are fully closed as indicated at 116. The space included between lines 116 and 117 denotes the interval in which the parison is exposed from the start of the blank mold opening to the final closing of the finishing mold. The lines 111 and 115 designate the points between which both blank and finishing molds are at their widest opening, thereby completely exposing the parison except at the head F, which, due to the short length of both blank and finishing molds, permits overlapping of the movements.

In view of the foregoing, it will be apparent that the time formerly required to complete the transfer operation has been reduced to a minimum with the result that a uniform high quality ware may be produced by the elimination of excess strain, chill and other difficulties now encountered in the process of fabrication.

Modified means for automatically closing the finishing molds in predetermined relation to the point of blank mold opening is illustrated in Figs. 13 to 15 inclusive and for this purpose I provide an air motor 120 similar to the motor 69. The motor 120 comprises a cylinder 121 and piston 122 for opening and closing the molds 18. Air is supplied to the motor 120 from the channel 57 in the carriage 15 and is controlled by a valve 123 formed integrally with the cylinder 121. A plunger 124 mounted within the valve body is adapted to alternately place the opposite ends of the motor in communication with the supply of air.

As shown in Fig. 15 the air enters the valve 123 through a port 125 which is in communication with a passage 126 leading to the forward or left-hand end of the motor. As the piston 122 moves to the right the air in that end is permitted to escape through a passage 127 and one of a pair of exhaust ports 128. While the valve plunger and piston are in the position shown the finishing molds are being held in open position. The valve plunger is shifted to the position shown by means of a rod 129 formed on one end of the plunger and projecting through the valve casing toward the column 16 of the machine. A cam 130 common to all of the molds and mounted on the column 16 engages an arm 131 pivoted on the motor 120 to periodically shift the plunger for opening the molds.

The molds are closed at predetermined intervals, individual to each mold, which are regulated by the position of the movable inclined track section 73. A poppet valve 132 is mounted in each mold carrier 29 adjacent the supporting roll 74 and is actuated by passing over a cam 133 bolted to the inclined track 73. A pipe 134 connects the valve 132 with the forward end of the valve 123 whereby when the cam 133 opens the valve a puff of air shifts the plunger 124 to the right to close the molds. Air under pressure is supplied to the valves 132 from the main source of supply.

It will be observed that the cam 133 is positioned slightly in advance of the final raising movement of the mold carriers in order to permit the earliest possible closing of the molds which automatically limits the interval during which the parison is exposed while being transferred. The relation of the final rise of the finishing molds to the cam 133 is illustrated in the chart of operation (Fig. 12).

Modifications may be resorted to which are within the spirit and scope of my invention.

I claim:

1. In a machine for forming hollow glass articles, a mold carriage, a series of parison forming molds each having a capacity less than that of the preceding mold mounted on the carriage, means for continuously rotating said carriage about a vertical axis, means for charging the molds in succession from a supply body of molten glass, adjustable means individual to the molds for automatically opening the latter at predetermined intervals according to the capacity thereof to expose the formed parisons, carriers mounted for vertical swinging movement on the carriage beneath the parison molds, finishing molds on said carriers, a track for supporting the carriers during rotation of the machine, a movable inclined section forming a part of said track and positioned to raise the finishing molds into cooperating position with the exposed parison, means normally urging said section into one of a number of selected positions, means individual to each finishing mold and operable by rotation of the carriage for automatically determining the selected position of the movable track section.

2. In a glassware forming machine, a mold carriage, means for continuously rotating the same about a vertical axis, a plurality of parison forming units on the carriage including partible body parison and neck molds, means for forming parisons in said units, means for opening the body parison molds to leave the parisons suspended from the neck molds, means for individually advancing or retarding the opening of the body parison molds, finishing mold carriers mounted for vertical swinging movement on the mold carriage to parison transferring positions, finishing molds on said carriers, means for opening and closing the finishing molds, a track supporting the carriers, said track having an inclined portion movable circumferentially of the machine, automatic means operable at regular time intervals upon rotation of the carriage for regulably adjusting the position of the inclined portion of the track relative to the points at which the body parison molds are opened, and means for individually advancing or retarding the closing of the finishing molds.

3. In a glassware forming machine, a mold carriage, means for continuously rotating the carriage about a vertical axis, a plurality of parison forming units on the mold carriage including partible body parison and neck molds, said units being of different capacities for the formation of glassware of different sizes, means for forming parisons in said units, means for opening the body parison molds to leave the parisons suspended from the neck molds, carriers mounted for vertical swinging movement on the mold carriage to parison transferring positions, finishing molds on said carriers, means for opening and closing the finishing molds, a track supporting said carriers, said track having an inclined portion movable circumferentially of the machine, automatic means operable at regular time intervals upon rotation of the carriage for regulably adjusting the position of the inclined portion of the track to compensate for the varying capacities of said units, and means for individually advancing or retarding the closing of the finishing molds.

4. In a glassware forming machine, a mold carriage, means for continuously rotating the carriage about a vertical axis, a plurality of parison forming units spaced on the mold carriage including partible body parison and neck molds, each succeeding unit differing in capacity from the preceding unit and being adapted for the formation of glassware of different sizes, means for forming parisons in said units, means for opening the body parison molds to leave the parisons suspended from the neck molds, carriers mounted for vertical swinging movement on the mold carriage to parison transferring positions, finishing molds on the carriers, means for opening and closing the finishing molds, a track having an inclined portion supporting said carriers, said inclined portion movable circumferentially of the machine, automatic means operable at regular time intervals upon rotation of the carriage for periodically and successively shifting the position of the inclined portion in one direction to compensate for the differences in the capacities of the parison forming units, and means for individually varying the time of closing of the finishing molds.

5. A machine for forming hollow glass articles comprising a mold carriage, a series of parison forming units each having a capacity less than that of the preceding unit mounted on the carriage, said units including partible body parison and neck molds, means for continuously rotating said carriage about a vertical axis, means for charging the units in succession from a supply body of molten glass, means for automatically opening said body parison molds to expose the formed parisons, means for individually advancing or retarding the opening of said body parison molds, carriers mounted for vertical swinging movement on the carriage beneath the units, finishing molds on said carriers, a track for supporting the carriers during rotation of the machine, a movable inclined section forming a part of said track and positioned to raise the carriers to elevate the finishing molds into register with the exposed parison, means automatically operable upon rotation of the carriage for automatically shifting the position of the movable track section to various preselected positions, means for regulably adjusting the positions to which the movable track section may be shifted, and means for automatically closing the raised finishing molds.

6. A machine for forming hollow glass articles comprising a mold carriage, a series of parison forming units each having a capacity less than that of the preceding unit mounted on the carriage, said units including partible body parison and neck molds, means for continuously rotating said carriage about a vertical axis, means for charging the units in succession from a supply body of molten glass, means for automatically opening said body parison molds to expose the formed parisons, means for individually advancing or retarding the opening of said body parison molds, carriers mounted for vertical swinging movement on the carriage beneath the units, finishing molds on said carriers, a track for supporting the carriers during rotation of the machine, a movable inclined section forming a part of said track and adapted to raise the carriers to elevate the finishing molds into register with the exposed parison, a motor connected to said inclined track section and normally urging the latter in one direction, a series of stop members in the path of said section for periodically holding it at predetermined positions throughout the length of its travel, means operable upon movement of the mold carriage for successively releasing said stop members to permit shifting of the section by the motor, and means for closing said finishing molds.

JOHN RALPH HOGE.